(12) United States Patent
Pawlowski et al.

(10) Patent No.: US 11,795,961 B2
(45) Date of Patent: Oct. 24, 2023

(54) FAN WHEEL AND METHOD FOR MAKING A FAN WHEEL

(71) Applicant: Andreas Stihl AG & Co. KG, Waiblingen (DE)

(72) Inventors: Jan Pawlowski, Poppenweiler (DE); Benjamin Barth, Rosengarten (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 17/829,959

(22) Filed: Jun. 1, 2022

(65) Prior Publication Data

US 2022/0389934 A1    Dec. 8, 2022

(30) Foreign Application Priority Data

Jun. 2, 2021  (EP) ..................................... 21177368

(51) Int. Cl.
    *F04D 29/02*   (2006.01)
    *F01P 5/04*    (2006.01)
    *F04D 29/28*   (2006.01)

(52) U.S. Cl.
    CPC .............. *F04D 29/023* (2013.01); *F01P 5/04* (2013.01); *F04D 29/281* (2013.01)

(58) Field of Classification Search
    CPC .......... F04D 29/03; F02D 29/662; H02K 9/06
    See application file for complete search history.

(56) References Cited

U.S. PATENT DOCUMENTS

| | | | |
|---|---|---|---|
| 3,828,212 A | 8/1974 | Harkness et al. | |
| 4,836,297 A * | 6/1989 | Dorner | ................ B27B 17/0033 173/162.1 |
| 6,242,828 B1 | 6/2001 | Rose, Sr. | |
| 2006/0022540 A1 | 2/2006 | Leufen et al. | |
| 2010/0083511 A1 | 4/2010 | Shimokawa et al. | |
| 2013/0129523 A1 | 5/2013 | Garrard | |
| 2013/0236312 A1* | 9/2013 | Simofi-Ilyes | ............. F01P 5/04 416/170 R |

(Continued)

FOREIGN PATENT DOCUMENTS

| | | |
|---|---|---|
| CN | 201065911 Y | 5/2008 |
| CN | 206753945 U | 12/2017 |
| DE | 35 46 029 A1 | 6/1987 |

(Continued)

*Primary Examiner* — Long T Tran
(74) *Attorney, Agent, or Firm* — Walter Ottesen, P.A.

(57) ABSTRACT

The disclosure concerns a fan wheel, including a base body with a rotational axis, and a swing part. The base body is made of a first material and the swing part is made of a second material. The density of the second material and the density of the first material are different. The swing part has a surface. The swing part is at least partially surrounded by the base body, so that the base body covers at least 80%, in particular at least 90%, preferably at least 95% of the surface of the swing part. The first material has a first thermal expansion coefficient, and the second material has a second thermal expansion coefficient. The second thermal expansion coefficient amounts to 70% to 110%, in particular 80% to 100%, preferably 85% to 95% of the first thermal expansion coefficient, and/or the swing part is substantially annular and runs fully closed around the rotational axis.

20 Claims, 8 Drawing Sheets

(56) References Cited

U.S. PATENT DOCUMENTS

2015/0295487 A1    10/2015   Stagg et al.
2017/0167500 A1     6/2017   Wolf et al.

FOREIGN PATENT DOCUMENTS

| DE | 10 2004 036 548 A1 | 3/2006 |
|----|--------------------|--------|
| EP | 3 181 910 A1       | 6/2017 |
| JP | 2019124129 A       | 7/2019 |

\* cited by examiner

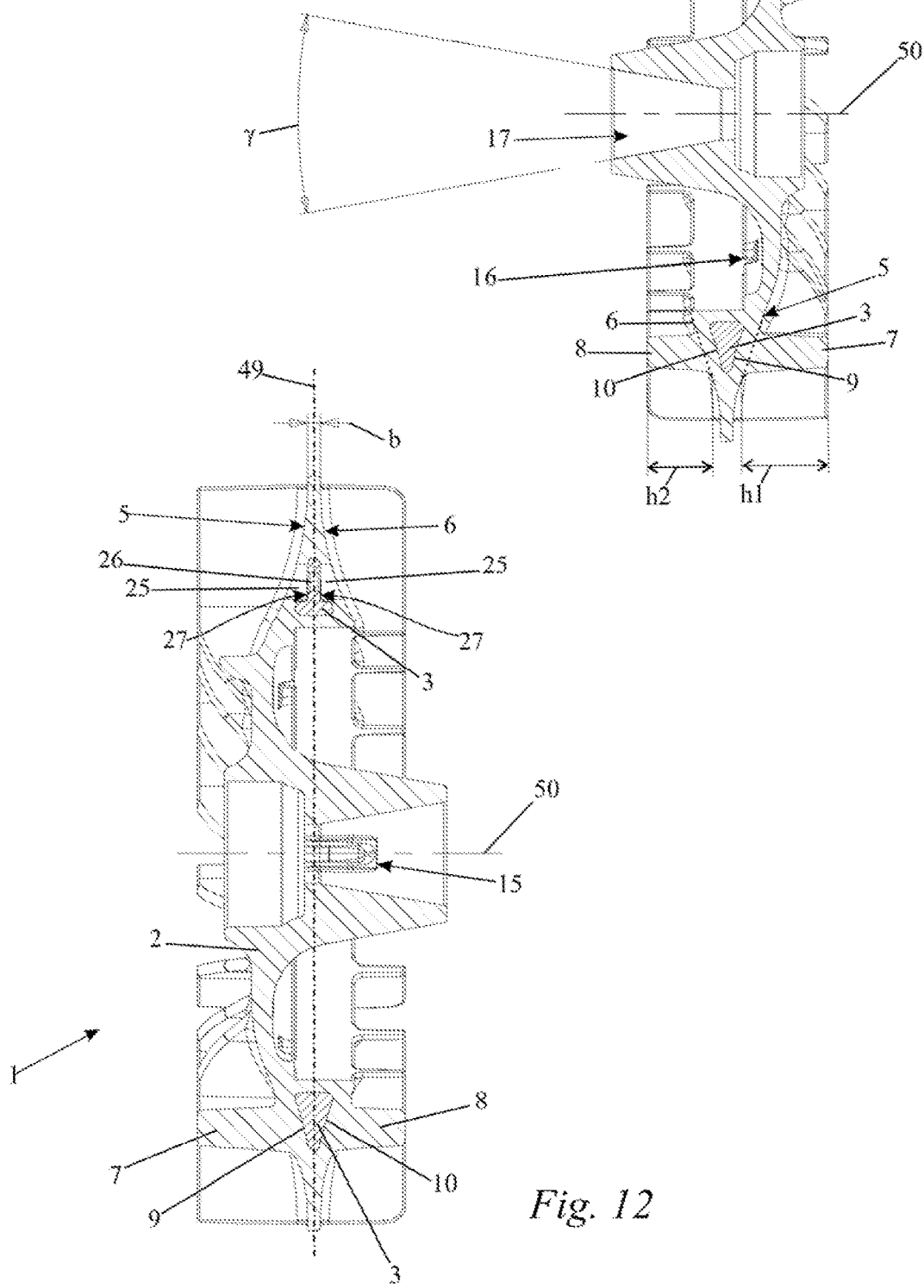

FAN WHEEL AND METHOD FOR MAKING A FAN WHEEL

CROSS REFERENCE TO RELATED APPLICATION

This application claims priority of European patent application no. 21 177 368.4, filed Jun. 2, 2021, the entire content of which is incorporated herein by reference.

TECHNICAL FIELD

The disclosure concerns a fan wheel, and a method for production of a fan wheel.

BACKGROUND

Fan wheels are used for example for conveying cooling air in internal combustion engines. For this, a fan wheel is rotationally fixedly attached to the crankshaft of the combustion engine. Such a fan wheel usually serves at the same time as a flywheel for the combustion engine. Fan wheels are also used to convey cooling air in work apparatus driven by an electric motor.

CN 201065911 Y describes a fan wheel in which a balancing weight made of iron is cast into the base body in order to balance the fan wheel. Such a fan wheel has a low stability.

SUMMARY

It is an object of the disclosure to refine a fan wheel such that the fan wheel is easy to manufacture and has a high stability.

This object can, for example, be achieved by a fan wheel which includes: a base body defining a rotational axis; a swing part; the base body being made of a first material having a first density; the swing part being made of a second material having a second density; the second density and the first density being different; the swing part having a surface; the swing part being at least partially surrounded by the base body so that the base body covers at least 80% of the surface of the swing part; the first material having a first thermal expansion coefficient; the second material having a second thermal expansion coefficient; and, the second thermal expansion coefficient amounting to 70% to 110% of the first thermal expansion coefficient; and, the swing part being substantially annular and running fully closed around the rotational axis.

It is a further object of the disclosure to provide a method which can be used to produce a fan wheel which also has a high stability in operation.

This object can, for example, be achieved by a method for making a fan wheel having a base body with a rotational axis, and a swing part, wherein the base body is made of a first material and the swing part is made of a second material, wherein a second density of the second material and a first density of the first material are different, wherein the swing part is at least partially surrounded by the base body and the fan wheel has an alignment element for alignment relative to a crankshaft of a combustion engine, and wherein, as a result of the swing part, the fan wheel has an imbalance with respect to the rotational axis. The method includes: casting the swing part into the first material of the base body in a casting process step; and, establishing a position of the alignment element in the casting process step in which the swing part is cast into the base body so that a precise positioning of the imbalance of the fan wheel relative to the alignment element is achieved.

The disclosure is based on the knowledge that the low stability of the fan wheel during operation is primarily caused by the fact that, because of the rotation of the fan wheel, the swing part exerts a centrifugal force on the base body of the fan wheel and thereby exposes the base body of the fan wheel to a high local load. With the fan wheel according to the disclosure, this effect is countered in that the swing part is substantially annular and runs fully closed around the rotational axis. With a closed annular swing part, all mass points subjected to the centrifugal force are connected together. This gives a structural stiffness of the swing part which counters a relative movement of the mass points relative to one another. A relative movement of the mass points is practically eliminated. The centrifugal force exerted by the swing part on the base body is almost completely eliminated. If the swing part were not closed but, for example, slotted, the supporting function which be lost precisely at the location of the slot. Then the relative movement would be countered only by the form stability which would diminish as the slot becomes larger. This would be associated with a greater load on the base body. The centrifugal force exerted by the swing part on the base body in the fan wheel according to the disclosure causes no weakening of stability of the base body of the fan wheel, even in the long term.

The disclosure is furthermore based on the knowledge that a low stability of the base body, in particular in operation, is caused by different expansion rates of the base body and swing part depending on temperature. In operation, the fan wheel conveys cooling air for cooling the combustion engine. It may also be provided that the fan wheel conveys cooling air for cooling an electric motor. Therefore it is usually arranged such that firstly heat is transferred from the combustion engine to the fan wheel, and secondly the fan wheel itself cools because of the conveyance of cooling air. Thus, in operation, great temperature fluctuations occur. Such temperature fluctuations may also occur in particular at very low exterior temperatures, for example, −20° C., if the motor runs hot in operation, during after-heating and on stoppage after the end of operation, in particular if the components around the core engine are after-heated. During such temperature fluctuations, both the swing part and the base body of the fan wheel expand or contract. If the swing part, which is at least partially enclosed by the base body, now expands more greatly than the base body and in particular more greatly than the receptacle formed in the base body for the swing part, in particular during operation of the fan wheel, higher stresses may occur which reduce the stability of the fan wheel. With the fan wheel according to the disclosure, this is prevented in that the first material of the base body has a first thermal expansion coefficient, the second material has a second thermal expansion coefficient, and the second thermal expansion coefficient amounts to 70% to 110%, in particular 80% to 100%, preferably 85% to 95% of the first thermal expansion coefficient. Thus the thermal expansion coefficients of the first material and second material are sufficiently similar for the temperature-dependent expansion of both materials to take place in comparable fashion, and the fan wheel has a high stability, in particular also during operation. Despite the different densities of the first material of the base body and the second material of the swing part, the fan wheel as a whole has a high stability. In particular, the integrity of the base body is thereby ensured.

A particularly high stability of the fan wheel is achieved if the second thermal expansion coefficient is 70% to 110%, in particular 80% to 100%, preferably 85% to 95% of the first thermal expansion coefficient, and the swing part is substantially annular and runs fully closed around the rotational axis.

The fan wheel may be configured in variants. The variants include a first variant and a second variant. The advantages of the disclosure are already achieved if the configuration of the fan wheel is selected from the variants, wherein according to the first variant, the second thermal expansion coefficient amounts to 70% to 110%, in particular 80% to 100%, preferably 85% to 95% of the first thermal expansion coefficient, and wherein according to the second variant, the swing part is substantially annular and runs fully closed around the rotational axis.

The thermal expansion coefficient is also known as a length expansion coefficient. The length expansion coefficient of a solid body with length is the proportionality constant between the temperature change and the relative length change dL/L.

Suitably, the swing part lies on the base body. Advantageously, the swing part directly contacts the base body. In particular, the swing part is cast into the first material of the base body. Thus the fan wheel can be produced in a simple fashion.

In particular, the swing part lies protected inside the base body. The flow behavior of the fan wheel is largely uninfluenced by the swing part. Suitably, the swing part does not protrude beyond the base body. Advantageously, the swing part is completely enclosed by the base body.

In an embodiment of the disclosure, because of the swing part, the fan wheel has an imbalance with respect to the rotational axis. In this way, the swing part may contribute to an even running behavior of the combustion engine. The swing part may thus be used as a counterweight to the movement of the piston of the combustion engine. In this way, vibrations, which would otherwise be transmitted from the combustion engine to other components of a working device including the combustion engine and fan wheel, can be reduced.

Suitably, the swing part has an imbalance with respect to the rotational axis. In this way, despite its substantially annular form, the swing part may be used as an imbalance part.

In particular, the imbalance of the swing part is formed by a recess in the otherwise substantially circular swing part. Thus the imbalance of the swing part can be produced in a simple fashion.

In particular, the swing part is symmetrical with respect to a plane of symmetry running perpendicularly to the rotational axis. This ensures a good flow behavior of the casting material during production of the fan wheel in a casting process.

Advantageously, the density of the second material is greater than the density of the first material. Thus the swing part may be used as an inertia ring. The swing part increases the inertia moment of the fan wheel. The base body of the fan wheel may consist of a material with comparatively low density. This achieves a low total weight of the fan wheel. In order however to achieve an even running behavior of a combustion engine on which the fan wheel may be mounted, the swing part is made of a material with a greater density. This gives an even running behavior of the fan wheel. Furthermore, during rotation, the fan wheel has a greater rotational energy. This promotes the use of the fan wheel as a flywheel. Because of the greater density of the second material of the swing part, the swing part may have a high mass for a small volume, allowing a saving of installation space. Thus the inertia moment of the fan wheel can be increased by the swing part using only a small installation space. In particular, the density of the second material is more than twice the density of the first material.

The base body has a first outer surface and a second outer surface. The first outer surface and the second outer surface point in opposite directions with respect to the rotational axis. Advantageously, first fan wheel vanes are arranged on the first outer surface of the base body. Advantageously, second fan wheel vanes are arranged on the second outer surface. In this way, both outer surfaces of the fan wheel may be used to convey cooling air. The first outer surface and the second outer surface of the fan wheel may be parts of different cooling air circuits.

In particular, adjacent first fan wheel vanes, which are arranged on the first outer surface, delimit a first air guiding surface. The first air guiding surface runs between the adjacent first fan wheel vanes and is formed by a part of the outer surface of the base body. The first air guiding surface serves to guide the cooling air conveyed by the fan wheel. Suitably, adjacent second fan wheel vanes, which are arranged on the second outer surface, delimit a second air guiding surface on the second outer surface. The second air guiding surface runs between the adjacent second fan wheel vanes and is formed by a part of the outer surface of the base body. The second outer surface serves to guide the cooling air conveyed by the fan wheel.

The first fan wheel vanes have a first total mass. The second fan wheel vanes have a second total mass. In particular, the first fan wheel vanes have a first maximum height measured from the first outer surface. The second fan wheel vanes have a second maximum height measured in the opposite direction from the second outer surface. Advantageously, the first maximum height is greater than the second maximum height.

In particular, the fan wheel can be formed as a radial fan.

The swing part has a center of gravity. Advantageously, the center of gravity lies in the middle between the first outer surface and the second outer surface of the swing part with respect to the direction of the rotational axis.

The swing part has a first lateral surface which faces the first outer surface of the base body. The swing part has a second lateral surface which faces the second outer surface of the base body. In an advantageous embodiment of the disclosure, a contour of the first lateral surface of the swing part follows a contour of the first outer surface of the base body. Suitably, a contour of the second lateral surface of the swing part follows a contour of the second outer surface of the base body. In this way, the installation space for the swing part may be optimally used and at the same time, an efficient air flow may be created by the contours of the first outer surface and the second outer surface of the base body. The first lateral surface of the swing part has a first distance from the first outer surface of the base body, measured in the direction of the rotational axis. In particular, the first distance is constant. The second lateral surface of the swing part has a second distance from the second outer surface of the base body, measured in the direction of the rotational axis. In particular, the second distance is constant.

In an embodiment of the disclosure, an outer distance measured between the first outer surface and the second outer surface in the direction of the rotational axis diminishes as the radial distance from the rotational axis increases. This allows an advantageous guidance of the flowing air. Advantageously, the first air guiding surface on the first outer surface slopes relative to the rotational axis. In particular, the second air guiding surface on the second outer surface slopes relative to the rotational axis.

In an embodiment of the disclosure, it is provided that the thermal expansion coefficient of the first material is between $21 \cdot 10^{-6}$ K$^{-1}$ and $23 \cdot 10^{-6}$ K$^{-1}$. Also, quite particularly advantageously, the thermal expansion coefficient of the second material is between $17 \cdot 10^{-6}$ K$^{-1}$ and $21 \cdot 10^{-6}$ K$^{-1}$.

In particular, the first material is a light metal alloy, and the second material is a heavy metal alloy. Advantageously, the first material is an aluminum alloy. In particular, the second material is a brass alloy. Alternatively, it may also be provided that the first material is a magnesium alloy.

It may be provided that the fan wheel is part of a manually guided, hand-held work apparatus with an arm and a motor. In particular, the motor is a combustion engine.

It may however also be provided that the motor is an electric motor. The transmission of vibrations to the arm may be reduced by the above-described configurations of the fan wheel.

In particular, the imbalance of the fan wheel in a work apparatus with a combustion engine may be used as a counterweight for the piston movement. By targeted positioning of the imbalance, vibrations of the arm caused by the combustion engine can be reduced or largely suppressed.

According to the method of the disclosure, it is provided that the swing part is cast into the first material of the base body in a casting process step, and the position of the alignment element is established in the same casting process step in which the swing part is cast into the base body, so that a precise positioning of the imbalance of the fan wheel relative to the alignment element is achieved. This allows an efficient production of the fan wheel with slight tolerance for the relative position of the imbalance of the swing part and the alignment element of the base body. Achievement of the object by the method according to the disclosure is based on the knowledge that an imprecise relative positioning of the imbalance of the fan wheel and an imbalance of a combustion engine can lead to unfavorable imbalance conditions of the entire system. This may in turn lead to a greater level of vibrations and stresses in the components. The increased stresses and vibrations may reduce the stability of the fan wheel, in particular of the base body of the fan wheel, during operation of the fan wheel. Precise positioning of the imbalance of the fan wheel relative to the alignment element, for aligning the fan wheel relative to a crankshaft of the combustion engine, may achieve a reduction in vibrations of the entire system, which ensures the integrity of the fan wheel during operation of the fan wheel produced with the method according to the disclosure.

BRIEF DESCRIPTION OF THE DRAWINGS

The invention will now be described with reference to the drawings wherein:

FIG. 11 a sectional illustration of a section along section plane XI-XI of FIG. 9;

FIG. 12 a sectional illustration along section plane XII-XII of FIG. 9;

DESCRIPTION OF THE PREFERRED EMBODIMENTS

Figure 1:
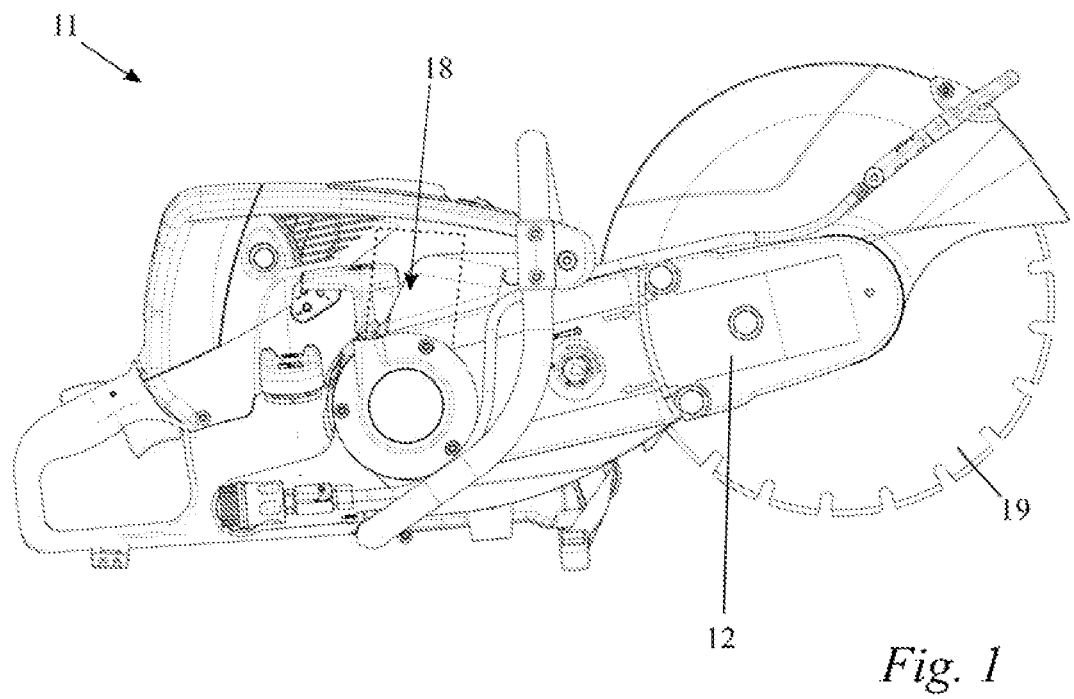
FIGS. 1 and 2 schematic side views of a manually guided work apparatus with a fan wheel.

FIG. 1 shows a manually guided work apparatus 11. The manually guided work apparatus 11 is an angle grinder. The manually guided work apparatus may however also be a motorized chainsaw, a brush cutter, a blower or a similar work apparatus.

Figure 2:
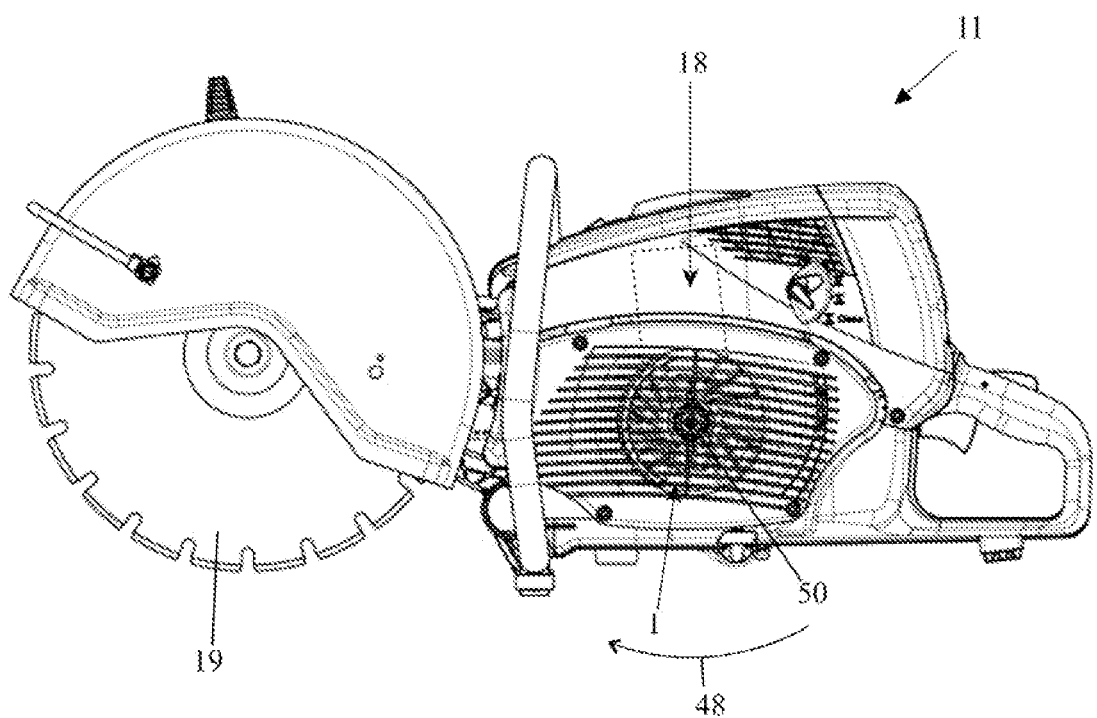

The manually guided work apparatus 11 has a combustion engine 18 (shown in dotted lines in FIGS. 1 and 2). Instead of the combustion engine, an electric motor may also be provided. The combustion engine 18 drives a tool 19. In the embodiment, the tool is a cutting disc. As shown in FIGS. 1 and 2, the cutting disc is mounted rotatably on an arm 12 of the manually guided work apparatus 11. A fan wheel 1 is arranged on the crankshaft (not shown) of the combustion engine 18 (FIG. 2). The fan wheel 1 is rotatable about the rotational axis 50. The fan wheel 1 is rotationally fixedly connected to the crankshaft of the combustion engine 18. The fan wheel 1 has a circumferential direction 48. The circumferential direction 48 runs around the rotational axis 50. The circumferential direction 48 in FIG. 2 points opposite the rotational direction of the fan wheel 1. The rotational direction of the crankshaft of the combustion engine 18 corresponds to the negative circumferential direction 48. The fan wheel 1 serves to convey cooling air. At the same time, the fan wheel 1 fulfils the function of a flywheel for the combustion engine 18. Advantageously, the fan wheel 1 has an imbalance. The imbalance of the fan wheel 1 serves as a counterweight to an imbalance generated by the combustion engine 18.

Figure 3:
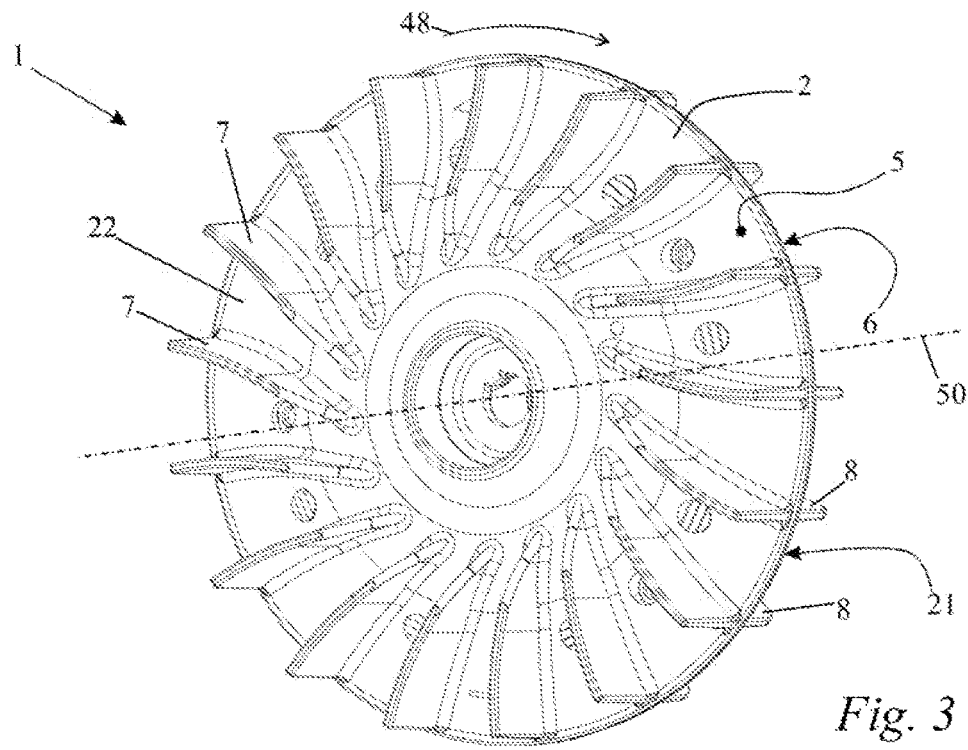
FIG. 3 a perspective illustration of the fan wheel of the manually guided work apparatus from FIGS. 1 and 2.

FIG. 3 shows the fan wheel in a perspective illustration. The fan wheel 1 has a base body 2. The base body 2 has a first outer surface 5 and a second outer surface 6. The first outer surface 5 and the second outer surface 6 point in opposite directions with respect to the rotational axis 50. First fan wheel vanes 7 are arranged on the first outer surface 5. Second fan wheel vanes 8 are arranged on the second outer surface 6. The first fan wheel vanes 7 and the second fan wheel vanes 8 extend from a radially inner region of the base body 2 up to a radially outer region of the base body 2. The circumferential direction 48 runs around the rotational axis 50. First fan wheel vanes 7, adjacent in the circumferential direction 48, delimit a first air guiding surface 20 on the first outer surface 5 of the base body 2. Second fan wheel vanes 8, adjacent in the circumferential direction 48, delimit a second air guiding surface 21 on the second outer surface 6 of the base body 2. Advantageously, the fan wheel 1 is a radial fan. In particular, the fan wheel 1 has vanes on both sides.

Alternatively, the fan wheel may have vanes on only one side. In other words, alternatively, it may be provided that fan wheel vanes are arranged on only one of the two outer surfaces 5 and 6 of the base body 2.

The second fan wheel vanes 8 on the second outer surface 6 of the base body 2 are used to convey cooling air for cooling the combustion engine 18. In this embodiment, the first fan wheel vanes 7 on the first outer surface 5 of the base body 2 are used to set in rotation the aspirated air in a channel (not shown). Thus heavier and larger particles carried by the air are flung away radially towards the outside. In this way, the aspirated air can be pre-cleaned and only then supplied to air filters and the intake duct of the combustion engine 18. Thus the air filters for the combustion air supplied to the intake duct of the combustion engine 18 have a longer service life, and the service life of the combustion engine 18 is extended.

Figure 4:
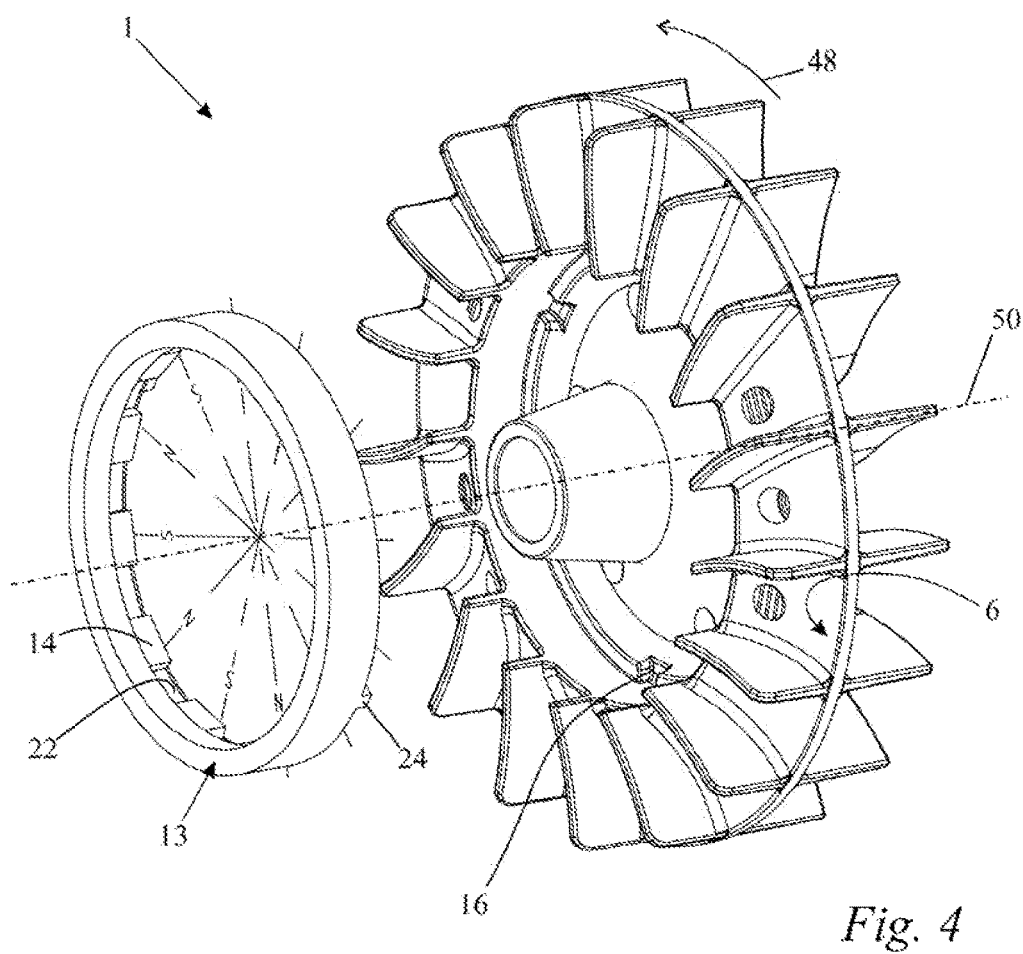
FIG. 4 an exploded illustration of the fan wheel from FIG. 3.

As shown in FIG. 4, the fan wheel 1 advantageously includes a magnet holder 13. The magnet holder 13 is arranged on the second outer surface 6 of the base body 2. The magnet holder 13 carries at least one magnet 14. In the embodiment, the magnet holder 13 is substantially annular. The magnet holder 13 runs around the rotational axis 50. Several magnets 14 are arranged next to one another in the circumferential direction 48. The magnet holder 13 includes a ground ring 22. The magnet 14 is arranged on the ground ring 22. The ground ring 22 is metallic and serves to reinforce the magnetic flux of the magnet 14.

The magnet holder 13 advantageously forms a rotor of a generator of the manually guided work apparatus 11. Advantageously, a stator of the generator is fixed on the crankcase (not shown) of the manually guided work apparatus 11. This stator includes at least one coil which cooperates with the rotor of the generator. On rotation of the fan wheel 1 about the rotational axis 50, the magnet 14 of the rotor formed by the magnet holder 13 induces a voltage in the coil of the stator. The voltage signal thus generated may be used as a signal for ignition of a spark plug of the combustion engine 18.

Figure 5:
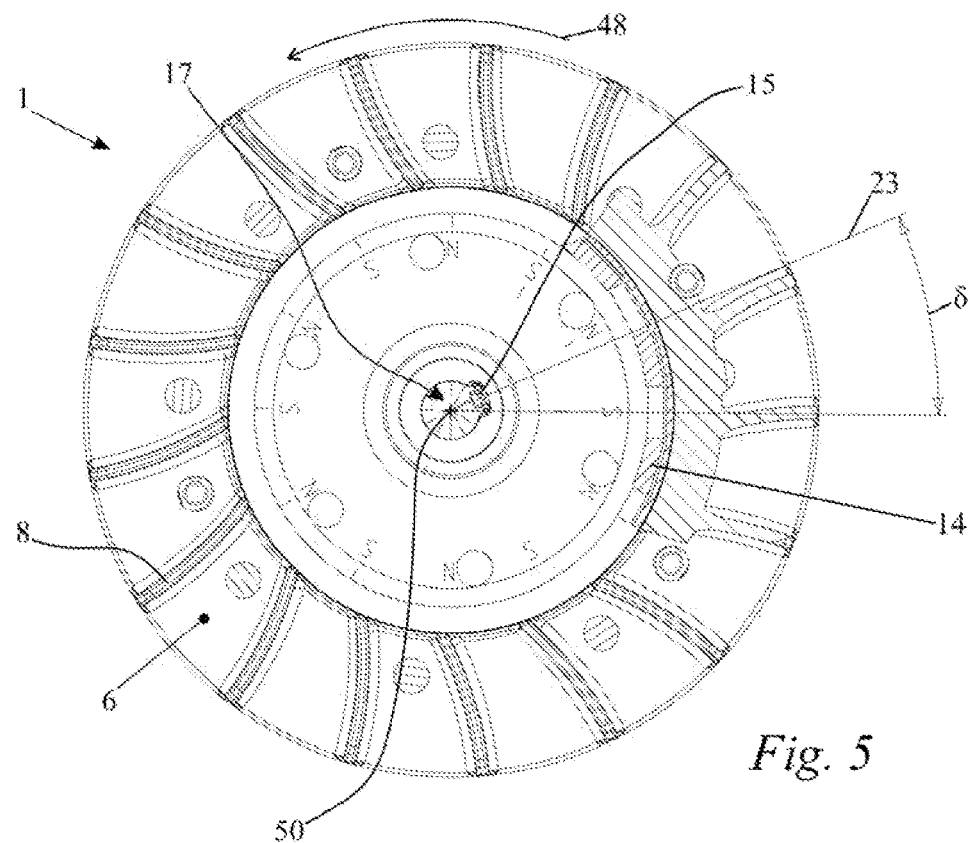
FIG. 5 a partially sectional illustration of a side view of the fan wheel from FIGS. 3 and 4.
Figure 8:
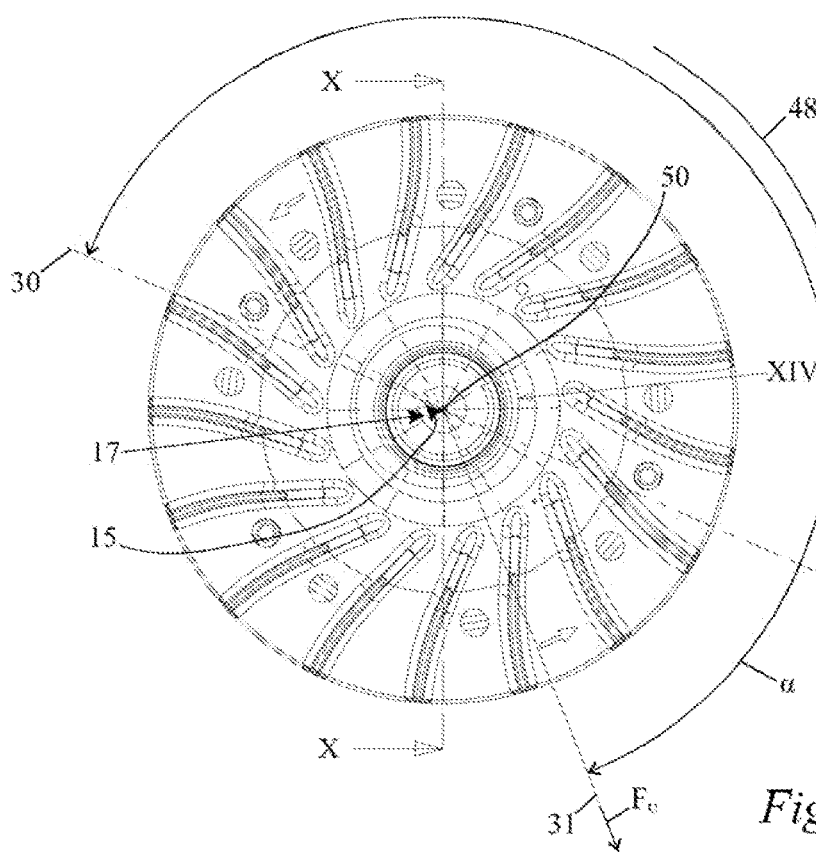
FIG. 8 a side view of the fan wheel from FIGS. 3 to 6.

To determine the ignition timing precisely, the relative position of the magnet 14 with respect to the crankcase is decisive. As shown in FIGS. 5 and 8, the base body 2 of the fan wheel 1 includes an alignment element 15. The alignment element 15 is arranged on a receptacle 17 for the crankshaft of the combustion engine 18. The receptacle 17 penetrates the base body 2 completely in the direction of the rotational axis 50. As FIG. 11 shows, the receptacle 17 has a conical form. An opening angle $\gamma$ of the receptacle 17 opens in the direction towards the crankshaft. The opening angle $\gamma$ amounts to 10° to 30°. The alignment element 15 protrudes in the radial direction relative to an inner periphery of the receptacle 17 (FIGS. 5 and 8).

Figure 14:
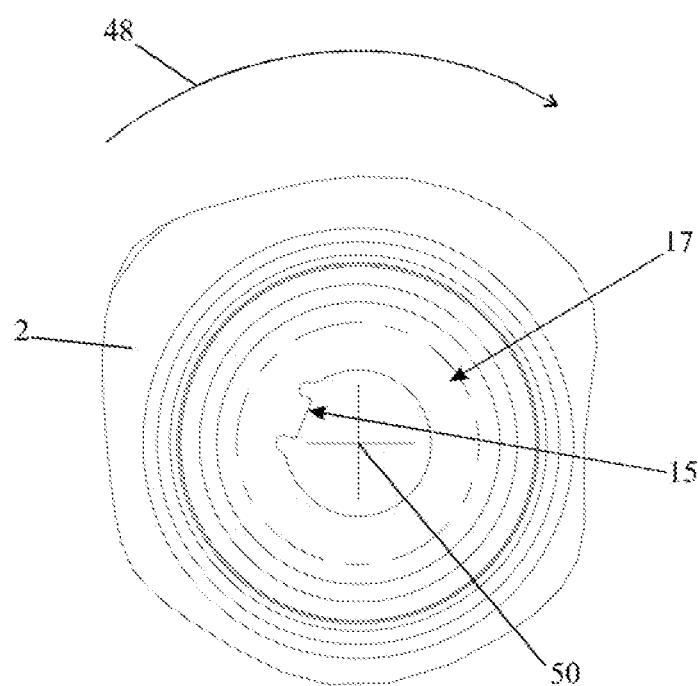
FIG. 14 a detail illustration of the detail marked XIV in FIG. 8.

FIG. 14 shows, in a detail illustration, that the alignment element 15 protrudes relative to an inner casing surface of the conical receptacle 17. On its sides with respect to the circumferential direction 48, the alignment element 15 is delimited by depressions in the inner conical casing surface of the receptacle 17.

The crankshaft of the combustion engine 18 has a positioning device (not shown) corresponding to the alignment element 15. The positioning device of the crankshaft in this embodiment is configured as a notch.

As FIG. 5 shows, the magnet 14 has a south pole and a north pole. The alignment element 15 has a central position 23 relative to the circumferential direction 48. The angular distance $\delta$, measured in the circumferential direction 48, between the south pole of the magnet 14 and the central position 23 of the alignment element 15, is established with a view to the ignition timing of the combustion engine 18. For this, the magnet 14 is fixed at a predefined position in the magnet holder 13, preferably by adhesive.

Figure 15:
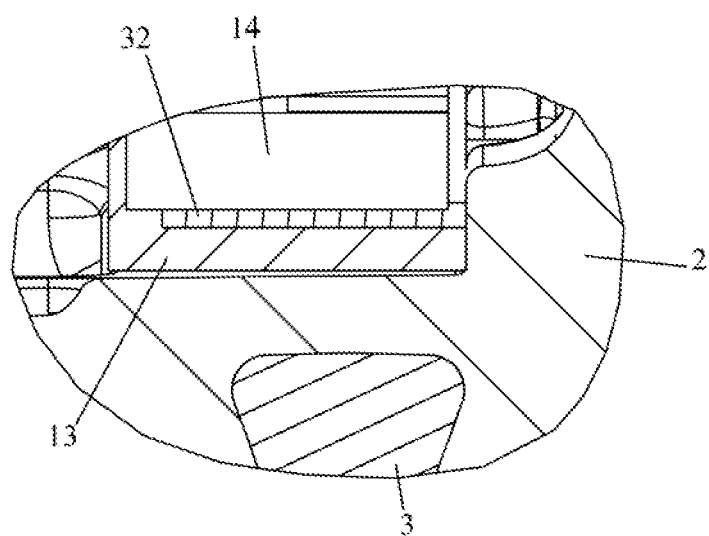
FIG. 15 a detail illustration of the detail marked XV in FIG. 10.

FIG. 15 shows the adhesive 32 between the magnet 14 and the magnet holder 13. The magnet holder 13 has a positioning lug 24, shown in FIG. 4. The positioning lug 24 protrudes in the direction of the rotational axis 50 on the base body 2 of the fan wheel 1. The base body 2 has a pre-positioning element 16, shown in FIGS. 4 and 9. In this embodiment, the pre-positioning element 16 is configured as a depression in the direction of the rotational axis, in the base body 2 of the fan wheel 1. The pre-positioning element 16 corresponds to the positioning lug 24 of the magnet holder 13. For positioning the magnet holder 13 on the base body 2 of the fan wheel 1, the magnet holder 13 is pre-positioned on the base body 2 by means of the positioning lug 24 and the pre-positioning element 16 after application of an adhesive. Before the adhesive hardens, the magnet holder 13 is positioned precisely relative to the base body 2 by means of a magnetic alignment device, and the adhesive hardens in this position of the magnet holder 13.

Figure 6:
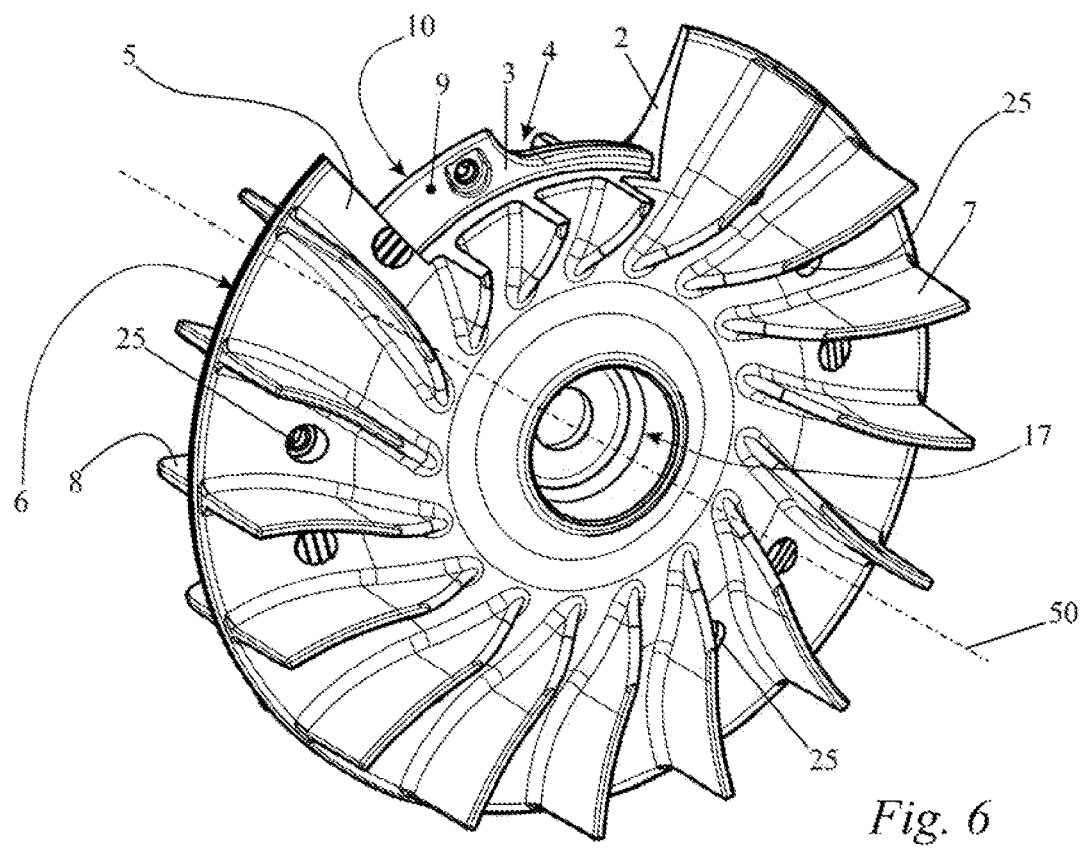
FIG. 6 a perspective, partially sectional illustration of the fan wheel from FIGS. 3 to 5.

The fan wheel 1 has a swing part 3, illustrated in FIG. 6. The swing part 3 is at least partially surrounded by the base body 2. The base body 2 is made of a first material. The swing part 3 is made of a second material. The density of the second material and the density of the first material are different. In particular, the density of the second material is more than twice the density of first material. The swing part 3 ensures that the fan wheel 1 has an imbalance relative to the rotational axis 50. Thus during operation, the fan wheel 1 has an imbalance force $F_U$ pointing radially towards the outside (see FIG. 8). The fan wheel 1 may be arranged on the crankshaft of the combustion engine 18 such that the imbalance force $F_U$ of the fan wheel 1 forms a counterweight to the centrifugal force generated by the piston and the crank cheeks of the combustion engine 18. The swing part 3 has an imbalance with respect to the rotation axis 50.

A further function of the swing part 3 in this embodiment is to increase the inertia moment of the fan wheel 1. In this embodiment, the fan wheel 1 serves as a flywheel for the combustion engine 18. In order to achieve an even running of the combustion engine 18, a high swung mass is desirable for the fan wheel 1 serving as a flywheel. At the same time, the total weight of the combustion engine 18 and hence also the fan wheel 1 should be as low as possible, in particular for use in the manually guided work apparatus 11 which is carried by the user during operation, in order to allow ergonomic working. The density of the second material of the swing part 3 is greater than the density of the first material of the base body 2. Accordingly, with a compact construction of the fan wheel 1, a high inertia moment of the fan wheel 1 can be achieved.

The base body 2 has the rotational axis 50 shown in FIG. 6. The rotational axis 50 runs from the first outer surface 5 up to the second outer surface 6 of the base body 2 of the fan wheel 1. The swing part 3 is cast into the first material of the base body 2. The swing part 3 has a surface. The base body 2 covers at least 80%, in particular at least 90%, preferably at least 95% of the surface of the swing part. In this embodiment, the base body 2 covers the swing part 3 completely with the exception of holding openings 25.

As shown in FIGS. 11 and 12, a holding opening 25 extends on each side of the swing part 3 with respect to the rotational axis 50. The holding openings 25 are advantageously created during production of the fan wheel 1 in a casting process. Before casting, the swing part 3 is positioned in the base body 2 of the fan wheel 1 by means of holding elements. This takes place preferably in a casting mold for the base body 2 of the fan wheel 1. Then the material of the base body 2 is cast around the swing part 3. The first material is also cast around the holding elements for holding the swing part 3. Then the holding elements are removed and the holding openings 25 remain in the base body 2 of the fan wheel 1 at the location of the holding elements.

It may also be provided that the base body 2 covers the surface of the swing part 3 to 100%. In this case, the holding openings 25 are subsequently filled with the first material of the base body or with another material. It may be provided that the base body 2 is formed from two different materials.

In the state of the fan wheel 1 installed in the work apparatus 11, the rotational axis 50 runs through the receptacle 17 for the crankshaft of the combustion engine 18.

Figure 7:
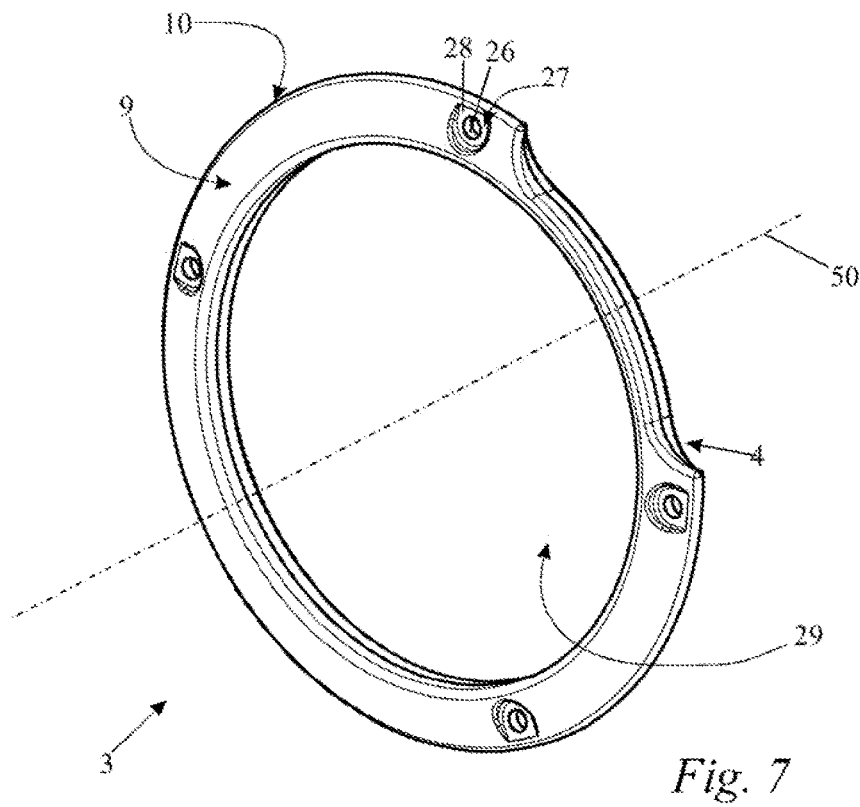
FIG. 7 a perspective illustration of a swing part of the fan wheel from FIGS. 3 to 6.

As shown in FIG. 7, the swing part 3 advantageously has at least one radial positioning opening 26. The radial positioning opening 26 penetrates the swing part 3 completely in the direction of the rotational axis 50.

The swing part 3 includes in particular a first depression 27. The swing part 3 has a first lateral surface 9. The first depression 27 is preferably made in the first lateral surface 9 of the swing part 3. The swing part 3 has a second lateral surface 10. As shown in FIGS. 11 and 12, a second depression 37 is made in the second lateral surface 10.

The first lateral surface 9 and the second lateral surface 10 advantageously point in opposite directions relative to the rotational axis 50. The first depression 27 in the first lateral surface 9 of the swing part 3, the radial positioning opening 26, and the second depression 37 in the second lateral surface 10 of the swing part 3, lie one behind the other in the direction of the rotational axis 50. In this embodiment, the radial positioning opening 26 connects the first depression 27 to the second depression 37. The radial positioning opening 26 advantageously creates a continuous opening through the swing part 3 in the direction of the rotational axis 50. In this embodiment, the first depression 27, the radial positioning opening 26, and the second depression 37 together form the holding opening 25. It may also be provided that the holding opening is formed solely by a depression in the swing part 3. In this embodiment, four first depressions 27 are provided in the first lateral surface 9 of the swing part 3. Four second depressions 37 are provided in the second lateral surface 10 of the swing part 3. Accordingly, in total, four radial positioning openings 26 are arranged in the swing part 3. In total, the swing part includes four holding openings 25. A maximum diameter of the first depression 27, measured in a plane perpendicular to the rotational axis 50, is greater than a maximum diameter of the associated radial positioning opening 26 measured in the same plane. The first depression 27 has a first base 28 (FIG. 7). A maximum diameter of the second depression 37, measured in a plane perpendicular to the rotational axis 50, is greater than a maximum diameter of the associated radial positioning opening 26 measured in the same plane. The second depression 37 has a second base 38.

For positioning the swing part 3 in the casting mold for the base body 2 of the fan wheel 1, advantageously at least two holding elements (not shown) are provided. At least one of the holding elements, advantageously the first holding element, has an end face which preferably includes a protrusion. The end face of the first holding element lies on the first base 28 of the first depression 27 of the swing part 3. The protrusion of the first holding element at least partially penetrates into the radial positioning opening 26 of the swing part 3. The protrusion lies against the circumferential side of the radial positioning opening 26.

The end face of the first holding element lies against the first base 28 of the first depression 27 in the first lateral surface 9 of the swing part 3. The end face of the second holding element lies against the second base 38 of the second depression 37 in the second lateral surface 10 of the swing part 3. The first base 27 lies opposite the second base 37 with respect to the direction of the rotational axis 50 and with respect to the radial positioning opening 26. The first holding element is assigned to the first lateral surface 9 of the swing part 3. The second holding element is assigned to the second lateral surface 10 of the swing part 3. The swing part 3 is clamped between the first holding element and the second holding element. In this way, a positioning of the swing part 3 with respect to the axial direction of the rotational axis 50 is achieved.

For radial positioning of the swing part 3 with respect to the rotational axis 50, a further first holding element is provided, the protrusion of which engages in a further radial positioning opening 26 of the swing part 3. The protrusion of this further first holding element also lies against an inner circumference of the further radial positioning opening 26. The contact of the first holding element on the inner periphery of the radial positioning 26, and of the further first holding element on the further radial positioning opening 26, achieves a radial positioning of the swing part 3 with respect to the rotational axis 50.

In this embodiment, four first holding elements and four second holding elements are provided.

As shown in FIG. 7, the swing part 3 has a central opening 29. The central opening 29 penetrates the swing part 3 completely in the direction of the rotational axis 50. The swing part 3 is arranged in the base body 2 such that the rotational axis 50 of the fan wheel 1 runs through the central opening 29 of the swing part 3 (FIGS. 6 and 7). The swing part 3 surrounds the rotational axis 50. The swing part 3 runs fully closed around the rotational axis 50. The swing part 3 is substantially annular. The swing part 3 may however also have any other form. It is important that the swing part 3 surrounds the rotational axis 50 fully closed. In the embodiment, the swing part 3 is delimited on its inner circumferential side by a circular inner circumference in a plane perpendicular to the rotational axis 50.

The imbalance of the swing part 3 relative to the rotational axis 50 is advantageously formed by a recess 4.

Figure 9:
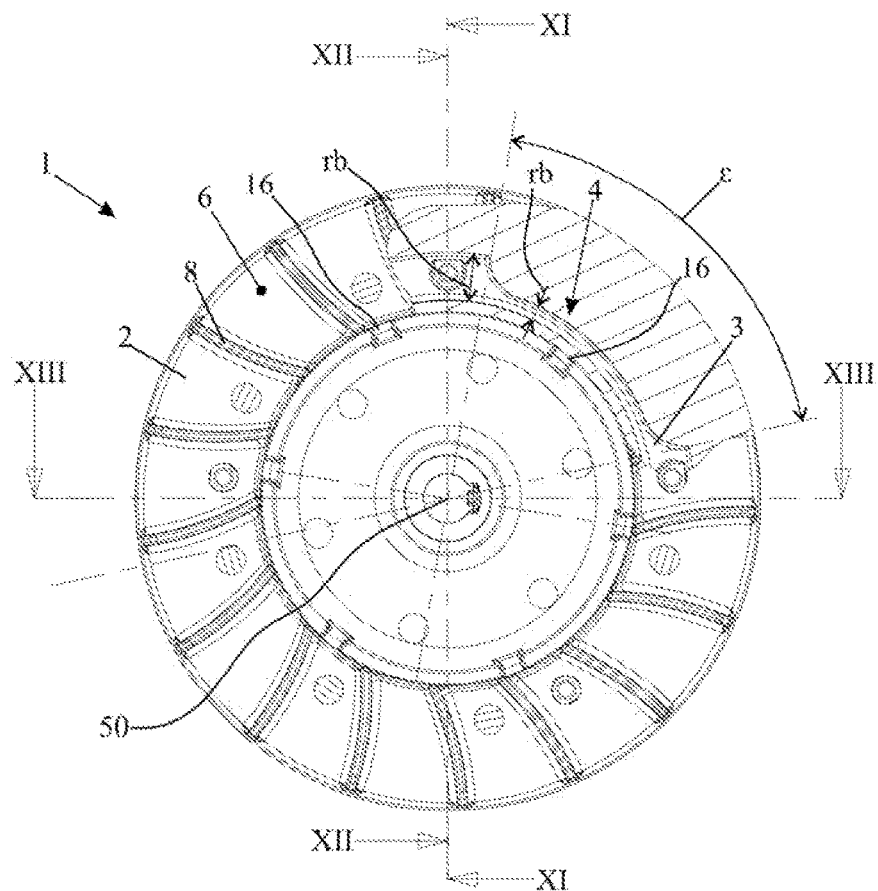
FIG. 9 a partially sectional illustration of the fan wheel from FIG. 8.
Figure 10:
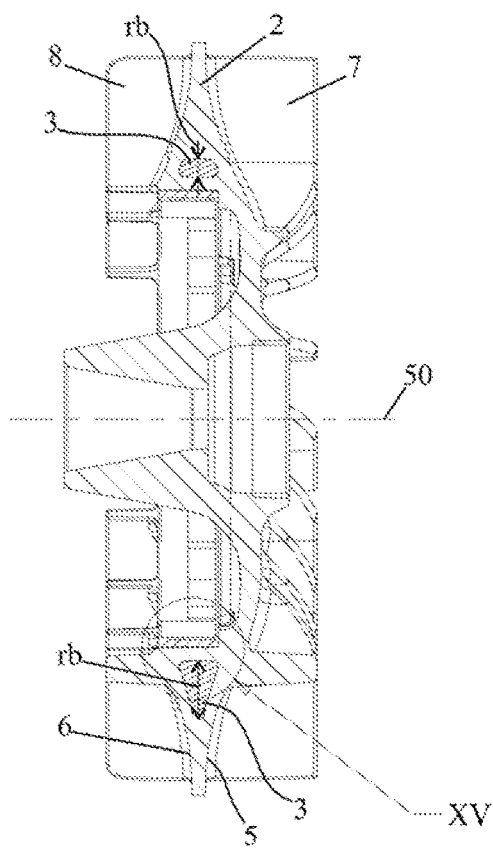
FIG. 10 a sectional illustration along section plane X-X of FIG. 8.

The recess 4 advantageously reduces a radial width rb of the swing part 3, measured in the radial direction relative to the rotational axis 50, over an angular region ε shown in FIG. 9. The radial width rb of the swing part 3 is in each case measured, starting from the inner circumference of the swing part 3, in the radial direction with respect to the rotational axis 50, away from the rotational axis 50. In the embodiment, the angular region ε is from 40° to 100°, in particular from 50° to 90°, preferably from 60° to 80°. In the angular region ε with reduced radial width rb, the radial width rb is less than half the maximum measured radial width. This is also shown in FIG. 10. Because of the recess 4, the fan wheel 1 has an imbalance. On rotation about the rotational axis 50, the resulting imbalance force $F_U$ acts, as shown in FIG. 8.

It may also be provided that the imbalance of the swing part 3 relative to the rotational axis 50 is formed by a protuberance instead of by a recess. Otherwise, an imbalance formed by a protuberance may have the same properties as the imbalance formed by the recess.

As shown in FIG. 10, the swing part 3 preferably has a portion with a substantially triangular form in a section plane containing the rotational axis 50.

In a section plane perpendicular to the rotational axis 50, the swing part 3 has a circular outer periphery except in the region of the recess 4. With the exception of the angular region ε, the outer contour of the swing part 3 is circular in a plane perpendicular to the rotational axis 50.

As FIG. 8 shows, the alignment element 15, for aligning the fan wheel 1 relative to a crankshaft of the combustion engine 18 in the circumferential direction 48, is arranged at an alignment angle position 30 relative to the rotational axis 50. In operation of the fan wheel 1, the imbalance force $F_U$ acts relative to the rotational axis 50 at the location of an imbalance angle position 31. The imbalance angle position 31 is unchanged relative to the fan wheel 1 during operation of the fan wheel. It turns with the fan wheel 1. The same applies to the alignment angle position 30. An imbalance angle α, measured starting from the alignment angle position 30, in the circumferential direction 48 against the rotational direction of the fan wheel 1, between the alignment angle position 30 and the imbalance angle position 31, lies between 180° and 270°, in particular between 200° and 250°, preferably between 220° and 230°. Thus the fan wheel 1 may be arranged on the crankshaft of the combustion engine 18 such that the imbalance angle position is situated at a defined crank angle when the piston of the combustion engine is at top dead center. This crank angle is measured with respect to the rotational axis 50, starting from top dead center, in the crank direction of the crankshaft. The defined imbalance angle position generates a counterweight to the imbalance which occurs because of the piston and the crank cheeks of combustion engine 18. In this way, bending stresses in the arm 12 (shown in FIG. 1) of the manually guided work apparatus can be minimized, since certain vibration modes are suppressed.

Figure 13:
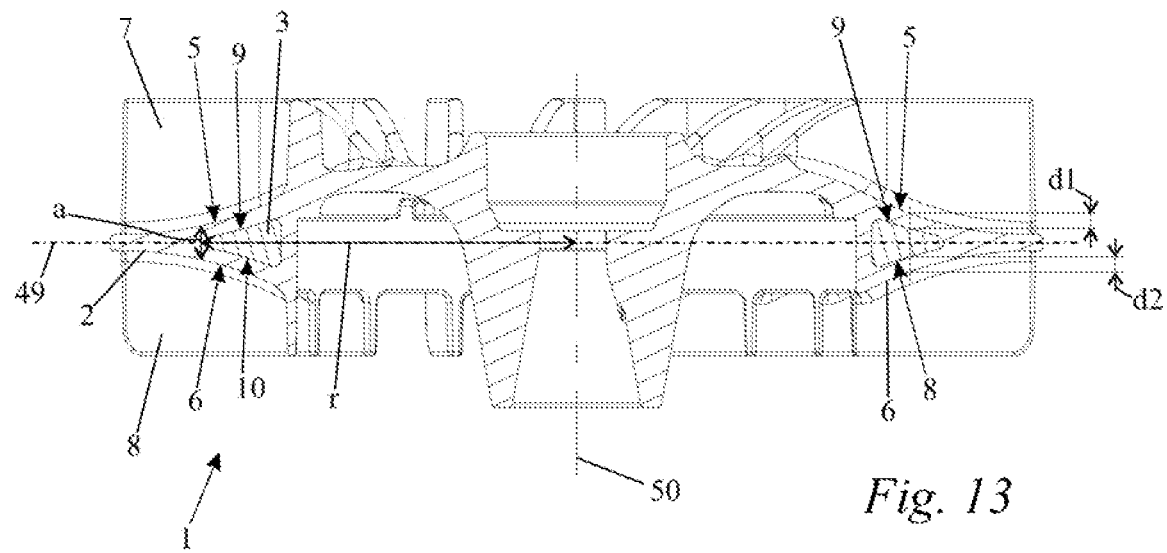
FIG. 13 a sectional illustration along section plane XIII in FIG. 9.

In the lower part of FIG. 11, the separating faces between the first fan wheel vanes 7 and the base body 2 of the fan wheel 1, and between the second fan wheel vanes 8 and the base body 2 of the fan wheel 1, are shown in dotted lines. This illustration and also FIG. 13 show that the first lateral surface 9 of the swing part 5 faces the first outer surface 5 of the base body 2. The second lateral surface 10 of the swing part 3 faces the second outer surface 6 of the base body 2. A contour of the first lateral surface 9 follows a contour of the first outer face 5. A contour of the second lateral surface 10 follows a contour of the second outer surface 6. This applies at least to regions of the swing part 3 outside the depressions 27. As shown in FIG. 13, the first lateral surface 9 has a first distance d1 from the first outer surface 5, measured in the direction of the rotational axis 50. The first distance d1 is constant. This means that the distance d1 is always the same size, irrespective of how far from the rotational axis 50 the distance d1 is measured. The second lateral surface 10 has a second distance d2 from the second outer surface 6, measured in the direction of the rotational axis 50. The second distance d2 is constant. This means that the distance d2 is always the same size, irrespective of how far from the rotational axis 50 the distance d2 is measured.

As also shown in FIG. 13, the first outer surface 5 has an outer distance a from the second outer surface 6, measured in the direction of the rotational axis 50. The outer distance a diminishes as the radial distance r from the rotational axis 50 increases. The first outer surface 5 of the base body 2 is convex in a radially inner region. The second outer surface 6 of the base body 2 is convex in a radially inner region. The first outer surface 5 of the base body 2 is concave in a radially outer region. The second outer surface 6 of the base body 2 is concave in a radially outer region. This applies at least for the region of the base body on which the fan wheel vanes 7, 8 are arranged.

As shown in FIG. 12, the first outer surface 5 has a minimum distance b from the second outer surface 6, measured in the direction of the rotational axis 50. A maximum distance (not shown) between the first outer surface 5 and the second outer surface 6 amounts to at least twice the minimum distance b.

A combined view of FIGS. 7 and 12 shows that the swing part 3 is symmetrical with respect to a plane of symmetry 49 running perpendicularly to the rotational axis 50. The swing part 4 has a center of gravity. The center of gravity lies in the middle between the first outer surface 5 and the second outer surface 6, relative to the direction of the rotational axis 50. The center of gravity lies in the plane of symmetry 49.

As shown in FIGS. 4 and 5, the first magnet 14 is arranged on the second outer surface 6 of the base body 2 of the fan wheel 1. The first fan wheel vanes 7 are arranged on the first outer surface 5 of the base body 2 of the fan wheel 1. The second fan wheel vanes 8 are arranged on the second outer surface 6 of the base body 2 of the fan wheel 1.

FIG. 11 shows a first maximum height h1 of the first fan wheel vanes 7. The second fan wheel vanes 8 have a second maximum height h2. The first maximum height h1 is measured starting from the first outer surface 5 of the base body 2, in the direction of the rotational axis 50, in the direction away from the base body 2. The second maximum height h2 is measured starting from the second outer surface 6 of the base body 2, in the direction of the rotational axis 50, in the direction away from the base body 2. The first maximum height h1 is advantageously greater than the second maximum height h2.

The swing part 3 is cast into the first material of the base body 2. The base body 2 directly contacts the swing part 3. The swing part 3 is at least partially surrounded by the base body 2 (FIGS. 6, 11 and 12). The swing part 3 does not protrude beyond the base body 2. The swing part 3 does not protrude beyond an outer contour of the base body 2, wherein the outer contour is formed disregarding the holding openings 25. The outer contour corresponds to the outer contour of a base body 2 in which the holding openings 25 have been filled so that the fillings continue the surface of the base body constantly. It may also be provided that the swing part 3 is completely enclosed by the base body 2.

The first material of the base body 2 has a first thermal expansion coefficient. The second material of the swing part 3 has a second thermal expansion coefficient. The second thermal expansion coefficient amounts to 70% to 110%, in particular 80% to 100%, preferably 85% to 95% of the first thermal expansion coefficient. The thermal expansion coefficient of the first material is approximately the same as the thermal expansion coefficient of the second material. The thermal expansion coefficient of the first material is between $21 \cdot 10^{-6}$ $K^{-1}$ and $23 \cdot 10^{-6}$ $K^{-1}$. The thermal expansion coefficient of the second material is between $17 \cdot 10^{-6}$ $K^{-1}$ and $21 \cdot 10^{-6}$ $K^{-1}$. The first material is a light metal alloy. The second material is a heavy metal alloy. In this embodiment, the first material is an aluminum alloy. It may also be provided that the first material is a magnesium alloy. In this embodiment, the second material is brass.

Because the swing part 3 is received in the base body 2, the air guidance of the fan wheel 1 is not disrupted by the swing part 3. The swing part 3 does not, or only to a slight extent, obstruct the air guidance of the air conveyed by the fan wheel 1. In particular, the air guiding surfaces 20 and 21

(shown in FIG. 3) are not disrupted by a swing part 3 protruding beyond the base body 2. Because of the described selection of the first material and second material based on thermal expansion coefficients, and because the swing part 3 surrounds the rotational axis 50 fully closed, the fan wheel 1 has an extremely advantageous rupture behavior.

The fan wheel 1 is produced in a casting process. Here, in a casting process step, the swing part 3 is cast into the first material of the base body 2. The position of the alignment element 15, for aligning the fan wheel 1 relative to the crankshaft of the combustion engine 18, is established in the same casting process step in which the swing part 3 was cast into the base body 2. Thus the precise position of the imbalance of the fan wheel 1 relative to the alignment element 15 is achieved. The imbalance angle α shown in FIG. 8 can be maintained with a very low error tolerance. The imbalance angle position 31 can be positioned very much more precisely than in a fan wheel in which the swing part is attached to the base body after manufacture of the base body of the fan wheel. Because of the precise positioning of the imbalance angle position 31 relative to the alignment element 15, the vibrations generated by the combustion engine 18 can be reduced. Thus the fan wheel 1 is also exposed to lower vibrations and the stability for the fan wheel 1 in operation is increased.

In the casting process, firstly the swing part 3 is positioned in a casting mold for the base body 2 of the fan wheel 1 by means of at least two first holding elements, such that the relative position of the imbalance of the swing part 3 and the part of the casting mold which forms the alignment element 15 in the casting process, is set as desired. Then the first material of the base body 2 is cast into the casting mold. During this process, the swing part 3 is advantageously cast into the base body 2. The position of the imbalance and the alignment element 15 are established in the same casting process step. In this way, a precise relative positioning of the imbalance and the alignment element 15 is possible.

It is understood that the foregoing description is that of the preferred embodiments of the invention and that various changes and modifications may be made thereto without departing from the spirit and scope of the invention as defined in the appended claims.

The invention claimed is:
1. A fan wheel, comprising:
a base body defining a rotational axis;
a swing part;
said base body being made of a first material having a first density;
said swing part being made of a second material having a second density;
said second density and said first density being different;
said swing part having a surface;
said swing part being at least partially surrounded by said base body so that said base body covers at least 80% of said surface of said swing part; and,
wherein at least one of:
said first material has a first thermal expansion coefficient, said second material has a second thermal expansion coefficient, said second thermal expansion coefficient amounting to 70% to 110% of said first thermal expansion coefficient; and,
said swing part is substantially annular and extends fully closed around the rotational axis.
2. The fan wheel of claim 1, wherein said swing part is cast into said first material of said base body.

3. The fan wheel of claim 1, wherein as a result of said swing part, the fan wheel has an imbalance with respect to the rotational axis.
4. The fan wheel of claim 1, wherein said swing part has an imbalance with respect to the rotational axis.
5. The fan wheel of claim 1, wherein said swing part is symmetrical with respect to a plane of symmetry running perpendicularly to the rotational axis.
6. The fan wheel of claim 1, wherein said second density is greater than said first density.
7. The fan wheel of claim 6, wherein said second density is more than twice said first density.
8. The fan wheel of claim 1, wherein said base body has a first outer surface and a second outer surface; and, said first outer surface and said second outer surface are directed in opposite directions with respect to the rotational axis.
9. The fan wheel of claim 8 further comprising:
a plurality of first fan wheel vanes arranged on said first outer surface; and,
a plurality of second fan wheel vanes arranged on said second outer surface.
10. The fan wheel of claim 9, wherein adjacent ones of said plurality of first fan wheel vanes delimit a first air guiding surface on said first outer surface; and, adjacent ones of said plurality of second fan wheel vanes delimit a second air guiding surface on said second outer surface.
11. The fan wheel of claim 8, wherein said swing part has a center of gravity; and, said center of gravity lies centrally between said first outer surface and said second outer surface with respect to a direction of the rotational axis.
12. The fan wheel of claim 8, wherein said swing part has a first lateral surface facing said first outer surface; said swing part has a second lateral surface facing said second outer surface; a contour of said first lateral surface follows a contour of said first outer surface; and, a contour of said second lateral surface follows a contour of said second outer surface.
13. The fan wheel of claim 8, wherein said first outer surface and said second outer surface mutually define an outer distance measured between each other in a direction of the rotational axis; and, said outer distance diminishes as a radial distance from the rotational axis increases.
14. The fan wheel of claim 1, wherein said first thermal expansion coefficient of said first material is between $21 \cdot 10^{-6} K^{-1}$ and $23 \cdot 10^{-6} K^{-1}$; and, said second thermal expansion coefficient of said second material is between $17 \cdot 10^{-6} K^{-1}$ and $21 \cdot 10^{-6} K^{-1}$.
15. The fan wheel of claim 1, wherein said first material is an aluminum alloy; and, said second material is a brass alloy.
16. The fan wheel of claim 1, wherein said base body covers at least 90% of the surface of said swing part.
17. The fan wheel of claim 1, wherein said base body covers at least 95% of the surface of said swing part.
18. The fan wheel of claim 1, wherein said second thermal expansion coefficient amounts to 80% to 100% of said first thermal expansion coefficient.
19. The fan wheel of claim 1, wherein said second thermal expansion coefficient amounts to 85% to 95% of said first thermal expansion coefficient.
20. A method for making a fan wheel having a base body with a rotational axis, and a swing part, wherein the base body is made of a first material and the swing part is made of a second material, wherein a second density of the second material and a first density of the first material are different, wherein the swing part is at least partially surrounded by the base body and the fan wheel has an alignment element for alignment relative to a crankshaft of a combustion engine, wherein, as a result of the swing part, the fan wheel has an imbalance with respect to the rotational axis, the method comprising:
- casting the swing part into the first material of the base body in a casting process step; and,
- establishing a position of the alignment element in said casting process step in which the swing part is cast into the base body so that a precise positioning of the imbalance of the fan wheel relative to the alignment element is achieved.

\* \* \* \* \*

UNITED STATES PATENT AND TRADEMARK OFFICE
CERTIFICATE OF CORRECTION

PATENT NO. : 11,795,961 B2
APPLICATION NO. : 17/829959
DATED : October 24, 2023
INVENTOR(S) : Jan Pawlowski et al.

It is certified that error appears in the above-identified patent and that said Letters Patent is hereby corrected as shown below:

In the Claims

In Column 14:
Line 45: delete "$_6K^{-1}$" and insert -- $^6K^{-1}$ -- therefor.

Signed and Sealed this
Twenty-eighth Day of May, 2024

Katherine Kelly Vidal
*Director of the United States Patent and Trademark Office*